United States Patent
Burstein et al.

(10) Patent No.: US 10,110,518 B2
(45) Date of Patent: Oct. 23, 2018

(54) HANDLING TRANSPORT LAYER OPERATIONS RECEIVED OUT OF ORDER

(71) Applicant: Mellanox Technologies Ltd., Yokneam (IL)

(72) Inventors: Idan Burstein, Karmiel (IL); Michael Kagan, Zichron Yaakov (IL); Noam Bloch, Bat Shlomo (IL); Ariel Shachar, Jerusalem (IL); Hillel Chapman, Ein HaEmek (IL); Dror Bohrer, Nesher (IL); Diego Crupnicoff, Buenos Aires (AR)

(73) Assignee: Mellanox Technologies, Ltd., Yokneam (IL)

( * ) Notice: Subject to any disclaimer, the term of this patent is extended or adjusted under 35 U.S.C. 154(b) by 109 days.

(21) Appl. No.: 14/132,014

(22) Filed: Dec. 18, 2013

(65) Prior Publication Data

US 2015/0172226 A1  Jun. 18, 2015

(51) Int. Cl.
*H04L 12/861*  (2013.01)
*H04L 12/879*  (2013.01)
(Continued)

(52) U.S. Cl.
CPC .... *H04L 49/9057* (2013.01); *G06F 15/17331* (2013.01); *H04L 49/901* (2013.01); *H04L 67/1097* (2013.01)

(58) Field of Classification Search
CPC .............. H04L 47/621; H04L 12/5693; H04L 49/9031; H04L 12/66; H04L 69/40;
(Continued)

(56) References Cited

U.S. PATENT DOCUMENTS 5,629,948 A  5/1997  Hagiwara et al.
6,434,620 B1  8/2002  Boucher et al.
(Continued)

FOREIGN PATENT DOCUMENTS

WO  2004/021628 A2  3/2004

OTHER PUBLICATIONS

Regnier et al., "ETA: Experience with an Intel Xeon Processor as a Packet Processing Engine", IEEE Micro, vol. 24, issue 1, pp. 24-31, Jan.-Feb. 2004.
(Continued)

*Primary Examiner* — Redentor Pasia
*Assistant Examiner* — Peter K Mak
(74) *Attorney, Agent, or Firm* — D. Kligler IP Services Ltd.

(57) ABSTRACT

A method for communication includes receiving at a receiving node over a network from a sending node a succession of data packets belonging to a sequence of transactions, including at least one or more first packets belonging to a first transaction and one or more second packets belonging to a second transaction executed by the sending node after the first transaction, wherein at least one of the second packets is received at the receiving node before at least one of the first packets. At the receiving node, upon receipt of the data packets, data are written from the data packets in the succession to respective locations in a buffer. Execution of the second transaction at the receiving node is delayed until all of the first packets have been received and the first transaction has been executed at the receiving node.

12 Claims, 2 Drawing Sheets

(51) Int. Cl.
*H04L 29/08* (2006.01)
*G06F 15/173* (2006.01)

(58) Field of Classification Search
CPC .. H04L 67/1097; Y02B 60/50; H04W 84/042; H04W 74/0833; H04W 72/0413; H04W 72/042; G06F 15/17331
USPC ........................................ 370/223, 334, 392
See application file for complete search history.

(56) References Cited

U.S. PATENT DOCUMENTS

| | | | |
|---|---|---|---|
| 6,848,029 B2 | 1/2005 | Coldewey | |
| 6,981,074 B2 | 12/2005 | Oner et al. | |
| 7,035,214 B1* | 4/2006 | Seddigh | H04L 1/1635 370/231 |
| 7,076,578 B2 | 7/2006 | Poisner et al. | |
| 7,218,566 B1 | 5/2007 | Totolos et al. | |
| 7,620,693 B1* | 11/2009 | Mott | H04L 47/621 709/213 |
| 7,620,749 B2 | 11/2009 | Biran et al. | |
| 7,760,741 B2 | 7/2010 | Biran et al. | |
| 7,924,848 B2 | 4/2011 | Biran et al. | |
| 8,213,315 B2 | 7/2012 | Crupnicoff et al. | |
| 8,576,715 B2 | 11/2013 | Bloch et al. | |
| 8,645,663 B2 | 2/2014 | Kagan et al. | |
| 2001/0037406 A1 | 11/2001 | Philbrick et al. | |
| 2003/0172208 A1 | 9/2003 | Fidler | |
| 2004/0034718 A1 | 2/2004 | Goldenberg et al. | |
| 2004/0042483 A1 | 3/2004 | Elzur et al. | |
| 2004/0049600 A1 | 3/2004 | Boyd et al. | |
| 2004/0062267 A1 | 4/2004 | Minami et al. | |
| 2004/0148376 A1 | 7/2004 | Rangan et al. | |
| 2004/0187122 A1 | 9/2004 | Gosalia et al. | |
| 2004/0215746 A1 | 10/2004 | McCanne et al. | |
| 2005/0027902 A1 | 2/2005 | King et al. | |
| 2005/0108446 A1 | 5/2005 | Inogai | |
| 2005/0132077 A1* | 6/2005 | Biran | H04L 69/16 709/230 |
| 2005/0246443 A1 | 11/2005 | Yao et al. | |
| 2006/0206635 A1 | 9/2006 | Alexander et al. | |
| 2007/0073915 A1 | 3/2007 | Go et al. | |
| 2007/0074091 A1 | 3/2007 | Go et al. | |
| 2007/0079185 A1 | 4/2007 | Totolos | |
| 2007/0162652 A1 | 7/2007 | Go et al. | |
| 2007/0204091 A1 | 8/2007 | Hofmann et al. | |
| 2008/0109526 A1* | 5/2008 | Subramanian | H04L 69/40 709/212 |
| 2010/0284397 A1* | 11/2010 | Poulin | H04L 12/66 370/352 |
| 2013/0054726 A1* | 2/2013 | Bugge | G06F 9/52 709/212 |
| 2014/0258438 A1* | 9/2014 | Ayoub | G06F 13/28 709/212 |

OTHER PUBLICATIONS

Infiniband Trade Association, "InfiniBandTM Architecture Specification", vol. 1, Release 1.2.1, Nov. 2007.

* cited by examiner

HANDLING TRANSPORT LAYER OPERATIONS RECEIVED OUT OF ORDER

FIELD OF THE INVENTION

The present invention relates generally to computer networks, and specifically to processing of communications received over such networks.

BACKGROUND

In computer networking, data packets are frequently delivered to their destination out of order, i.e., in a different order from that in which they were sent. Out-of-order delivery is most commonly caused by packets following multiple different paths through a network with different transmission latencies.

Out-of-order delivery is a common phenomenon in Internet Protocol (IP) networks. In the well-known Transmission Control Protocol (TCP), TCP frames are divided into multiple segments, which are encapsulated in corresponding IP data packets. Each segment carries a sequence number in the TCP header, and the length of the data payload in the segment can be derived from the length field in the IP header of the packet. Thus, even when the IP packets carrying the segments of a TCP frame arrive at their destination out of order, the receiver is able to reorder the packets and write the payloads to its local memory in the proper sequence.

To relieve the host processor of the burden of TCP processing in software, some network interface controllers (NICs) offer TCP offload capabilities. NICs of this sort are capable of both processing the TCP headers and of writing and reading data directly to and from the host memory. For example, U.S. Pat. No. 7,760,741 describes a network acceleration architecture for use with TCP. The architecture includes a hardware acceleration engine adapted for communication with and processing data from a consumer application, a software protocol processor adapted for carrying out TCP implementation, and an asynchronous dual-queue interface for exchanging information between the hardware acceleration engine and the software protocol processor. A virtually-contiguous reassembly buffer is used to handle out-of-order segments.

InfiniBand™ (IB) is a switched-fabric communications architecture that is widely used in high-performance computing. Computing devices (host processors and peripherals) connect to the IB fabric via a NIC that is referred to in IB parlance as a channel adapter. Host processors (or hosts) use a host channel adapter (HCA), while peripheral devices use a target channel adapter (TCA). The IB architecture defines both a layered hardware protocol (Physical, Link, Network, Transport Layers) and a software layer, which manages initialization and communication between devices.

Processes executing on nodes of an IB network communicate with one another using a queue-based model. Sending and receiving processes establish a queue pair (QP), which consists of a send queue (SQ) and a receive queue (RQ). Send and receive work requests (WR) by a process running on a host cause corresponding commands, known as work queue elements (WQEs), to be loaded into these queues for processing by the HCA. The WQE causes the HCA to execute a transaction, in which a message containing data is transmitted over the network. The message data may be spread over the payloads of multiple, successive packets. The transaction may comprise, for example, a remote direct memory access (RDMA) read or write transaction or a SEND transaction. (To receive a SEND message on a given QP, a receive WQE indicating the receive buffer address is posted to that QP.) Upon completion of a WQE, the HCA posts a completion queue element (CQE) to a completion queue, to be read by the initiating process as an indication that the WR has been fulfilled.

Each QP is treated by the IB transport layer as a unique transport service instance. The transport layer is responsible for in-order packet delivery, partitioning, channel multiplexing and transport services. The transport layer also handles transaction data segmentation when sending and reassembly when receiving. Based on the Maximum Transfer Unit (MTU) of the path, the transport layer divides the data into packets of the proper size. A receiver reassembles the packets based on the Base Transport Header (BTH), which contains the destination queue pair and packet sequence number (PSN). The receiving HCA acknowledges the packets, and the sending HCA receives these acknowledgements and updates the completion queue with the status of the operation.

InfiniBand specifies a number of different transport services, including Reliable Connection (RC), Unreliable Connection (UC), Reliable Datagram (RD), and Unreliable Datagram (UD). RC provides a reliable transfer of data between two entities, which supports RDMA operations and SEND operations, as well as atomic operations, with reliable channel semantics. As a connection-oriented transport, RC requires a dedicated queue pair (QP) for each pair of requester and responder processes. Recently-developed alternatives to the original RC model include the Extended Reliable Connected (XRC) transport service, in which a single receive QP to be shared by multiple shared receive queues (SRQs) across one or more processes running on a given host; and reliable connections provided by the Dynamically-Connected (DC) transport service, as described, for example, in U.S. Pat. No. 8,213,315.

SUMMARY

Embodiments of the present invention provide apparatus and methods that are useful in handling data packets received out of order.

There is therefore provided, in accordance with an embodiment of the present invention, a method for communication, which includes receiving at a receiving node over a network from a sending node a succession of data packets belonging to a sequence of transactions, including at least one or more first packets belonging to a first transaction and one or more second packets belonging to a second transaction executed by the sending node after the first transaction, wherein at least one of the second packets is received at the receiving node before at least one of the first packets. At the receiving node, upon receipt of the data packets, data are written from the data packets in the succession to respective locations in a buffer. Execution of the second transaction is delayed at the receiving node until all of the first packets have been received and the first transaction has been executed at the receiving node.

Typically, the execution of the second transaction is delayed even after all of the second packets have been received at the receiving node, until all of the first packets have been received and the first transaction has been executed.

In one embodiment, the first transaction causes the receiving node to write the data from the first packets to a host memory of the receiving node, and the second transaction causes the receiving node to read and transmit further data from the host memory to the sending node.

In disclosed embodiments, the succession of the data packets is received in a network interface controller (NIC) of the receiving node, and writing the data includes computing, in the NIC, respective locations in a host memory of the receiving node for the data in the data packets, and placing the data directly from the NIC into the respective locations. Typically, placing the data includes writing the data to the respective locations in an order of reception of the packets in the succession, irrespective of the transactions.

In some embodiments, the first and second transactions are executed by the sending node in response to first and second commands, having respective first and second command indices indicative of an order of execution of the commands, wherein the first and second packets respectively contain the first and second command indices, and delaying the execution includes determining the order of the execution of the first and second transactions at the receiving node responsively to the command indices contained in the packets. In one embodiment, the commands include work queue elements (WQEs), which are executed in succession on a single queue pair (QP).

There is also provided, in accordance with an embodiment of the present invention, communication apparatus, including a host interface, which is coupled to communicate with a host processor, having a host memory. A network interface is configured to receive over a network from a sending node a succession of data packets belonging to a sequence of transactions, including at least one or more first packets belonging to a first transaction and one or more second packets belonging to a second transaction executed by the sending node after the first transaction, wherein at least one of the second packets is received at the network interface before at least one of the first packets. Packet processing circuitry is coupled between the host interface and the network interface and is configured, upon receipt of the data packets, to write data from the data packets in the succession to respective locations in a buffer and to execute the first transaction while delaying execution of the second transaction until all of the first packets have been received and execution of the first transaction has been completed.

The present invention will be more fully understood from the following detailed description of the embodiments thereof, taken together with the drawings in which:

DETAILED DESCRIPTION OF EMBODIMENTS

Figure 1:
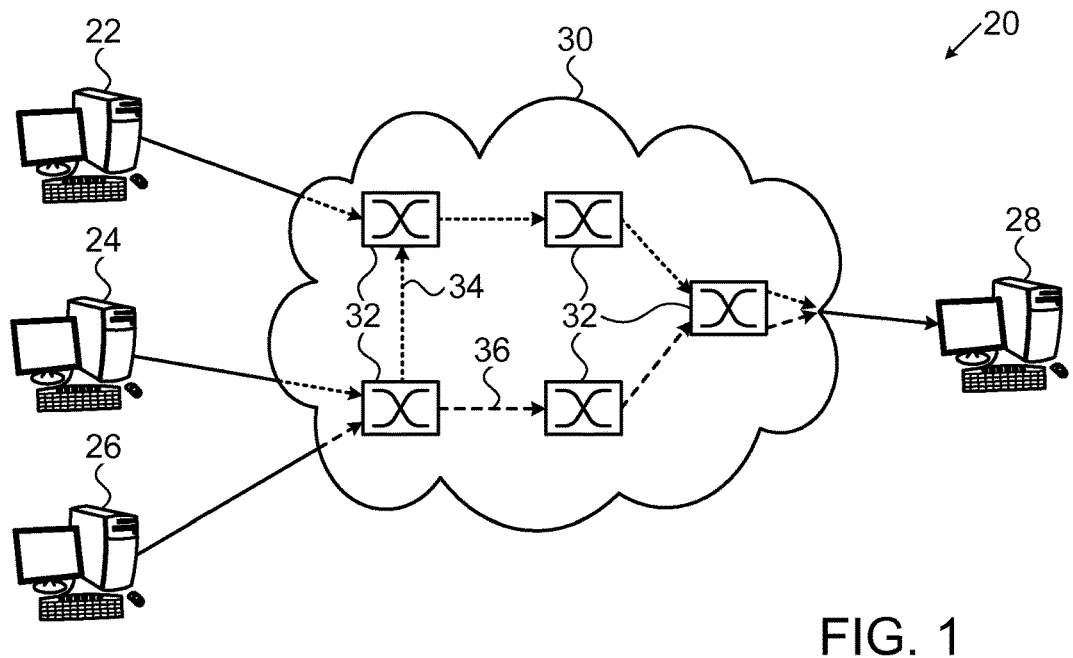
FIG. 1 is block diagram that schematically illustrates a computer system, in accordance with an embodiment of the present invention.

InfiniBand (IB) specifications require that all packets transmitted on a given QP using a reliable transport service be delivered to their destination in the order of transmission. This constraint on packet ordering simplifies and speeds the task of packet processing at the receiving NIC. Implementing the constraint at the network level, however, generally requires that all packets belonging to a given QP be transmitted over the same path, in order to avoid situations in which a packet traverses the network and arrives at its destination before another packet that was transmitted previously over a slower path. As a result, the use of efficient, adaptive routing schemes may be severely restricted.

Packet ordering in IB networks is important not only to ensure that the NIC receiving a succession of data packets be able place the data in host memory in the proper locations, but also to ensure that transport-layer transactions be performed in the proper order. For example, a given node may first execute a SEND or RDMA write transaction to generate a message, typically comprising multiple packets, which conveys data to be written to the host memory of a receiving node; and this first transaction may be followed by an RDMA read transaction, in which the given node sends a further packet asking to read data from the host memory of the receiving node. If the receiving node does not complete the first (write) transaction before executing the second (read) transaction, the data in the RDMA read response that it returns to the given node may be incorrect. This sort of error may occur if the RDMA read packet reaches the receiving node before the last of the RDMA write or SEND packets. Write followed by read is just one example of the sort of transaction sequence that has to be executed in order for proper application performance.

Thus, to enable out-of-order packet reception (and thus permit the use of adaptive routing) in IB networks and other RDMA-based transport schemes, it is important that the receiving NIC not only place the data in memory in the proper locations, but also execute the transactions in the in the proper order, regardless of the order of packet arrival. Embodiments of the present invention that are described hereinbelow address this need by tracking transaction order and delaying execution of later transactions at the receiving NIC until all of the packets in previous transactions have been received, and the previous transactions have been executed. Typically, execution of the later transaction is delayed even after all of the packets belonging to the later transaction have been received at the receiving node, until all of the packets in previous transactions have been received and the previous transactions have been executed.

At the same time, the receiving NIC typically writes the data received in incoming packets to respective locations in a buffer in the order in which the packets are received, regardless of the transaction order. For this purpose, in some embodiments, the NIC computes the respective locations in the host memory of the receiving node and places the data directly into the respective locations in their order of arrival, irrespective of the transactions to which the packets belong, and even when the order of arrival of the packets within a given transaction does not correspond to the order in which they were sent. In other embodiments, however, the NIC may hold at least some of the packets in a dedicated buffer memory until all the packets belonging to a given transaction have been received, and only then transfer the data into the host memory.

As explained earlier, in an environment such as an IB network, transactions are executed by the sending node in response to commands. Such commands may be in the form of WQEs, which are queued and executed in succession on a given QP. To enable the receiving NIC to keep track of the order of transactions and assign incoming packets to the proper transactions, the sending node may use command indices that are indicative of the order of execution of the commands, such as the indices of the WQEs that it executes. The sending node inserts the appropriate command index in each packet, typically along with an offset or other packet-specific value (since a given WQE will often generate a message that is spread over multiple packets). The receiving node reads and uses the command indices and offset values in determining the order of the execution of the transactions at the receiving node, as well as deciding where to place the data from each packet in the host memory.

FIG. 1 is block diagram that schematically illustrates a computer system 20, in accordance with an embodiment of the present invention. System 20 comprises multiple host computers 22, 24, 26, 28, . . . , which communicate with one another over a network 30 and thus function as nodes of the network. In the examples described here, network 30 comprises an IB switch fabric; but the principles of the present invention may similarly be applied in packet networks of other sorts, such as Internet Protocol (IP) networks, that are configured for transport-layer transaction support.

Network 30 typically comprises multiple subnets, which are interconnected by routers 32. At least some of host computers 22, 24, 26 and 28 may be located in different subnets, which may be connected by different routing paths. Adaptive routing techniques, such as the techniques described in U.S. Pat. No. 8,576,715, may be used in choosing the optimal routing path and changing the path as required. As a result, for example, sending computer 26 may initially transmit packets to receiving computer 28 via a path 34. Subsequently, routers 32 may choose a different path from computer 26 to computer 28, such as a path 36, possibly due to occurrence of congestion on path 34. As a result of this routing change, one or more packets conveyed over path 36 may reach computer 28 before another packet or packets that were transmitted previously over path 34. Computers 22, 24, 26, . . . , may encounter similar problems in packet streams that they receive. These problems are addressed by the embodiments described herein.

Figure 2:
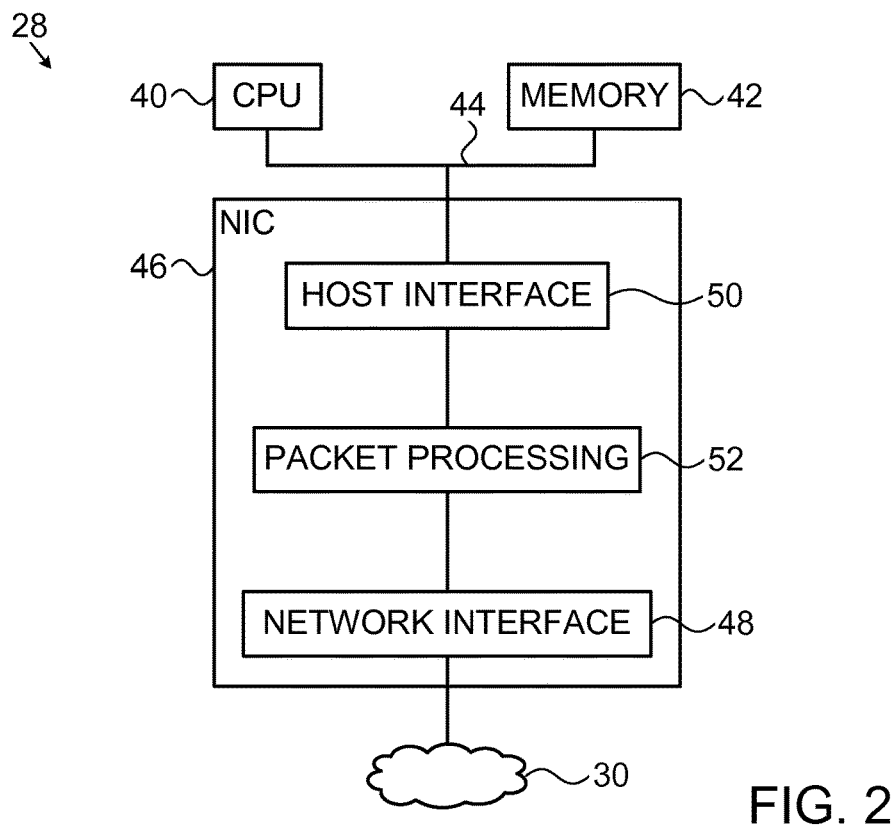
FIG. 2 is a block diagram that schematically illustrates components of a host computer, in accordance with an embodiment of the present invention.

FIG. 2 is a block diagram that schematically illustrates components of host computer 28, in accordance with an embodiment of the present invention. Computer 28 comprises a central processing unit (CPU) 40 and host memory 42, which are connected to a bus 44, such as a PCI Express® bus. The computer is linked to network 30 by a NIC 46, such as an IB HCA. NIC 46 is coupled to bus 44 by a host interface 50, which is capable of reading data from and writing data to memory 42 by direct memory access (DMA), as well as receiving certain instructions from and issuing interrupts to CPU 40. A network interface 48 in NIC 46 comprises one or more ports for transmitting packets to and receiving packets from network 30.

Packet processing circuitry 52 is coupled between host interface 50 and network interface 48. As in HCAs that are known in the art, circuitry 52 reads (via the host interface) WQEs that are posted to send and receive queues in memory 42 by processes running on CPU 40, and performs transactions accordingly. These transactions may include, for example, composing and transmitting data packets (via network interface 48) to network 30 in response to WQEs in the send queue, as well as writing data from incoming packets to memory 42 in response to WQEs in the receive queue. Upon receipt of data packets from network 30, circuitry 52 writes data from the data packets in the succession to respective locations in host memory 42 by DMA. Incoming RDMA write packets, for example, will contain an indication of the destination addresses in memory 42 to which the data should be written, while for incoming SEND packets, the destination addresses will be indicated by the receive WQE. Incoming RDMA read response packets, which are received in response to an RDMA read request issued to another node by NIC 46, are written by circuitry 52 to addresses in memory 42 indicated by the WQE in the send queue that invoked the transaction.

To handle out-of-order packet arrival, packet processing circuitry 52 comprises reordering logic and a reordering buffer for control transactions. These features of circuitry 52 are described hereinbelow in greater detail with reference to FIG. 3. As explained earlier, packet processing circuitry 52 is thus able to write data from incoming packets to the appropriate locations in memory 42 as the packets arrive, regardless of the actual order of arrival. Alternatively, packet processing circuitry 52 may write packet data temporarily to a dedicated buffer memory (not shown in the figures) associated with NIC 46, and may write the data from the buffer memory to host memory 42 only after having received all the packets in the transaction to which the data belong. Furthermore, the reordering logic causes circuitry 52 to delay execution of later transactions on a given QP (or at least some types of later transactions, such RDMA read responses) until all of the packets belonging to earlier transactions have been received and executed by circuitry 52.

Figure 3:
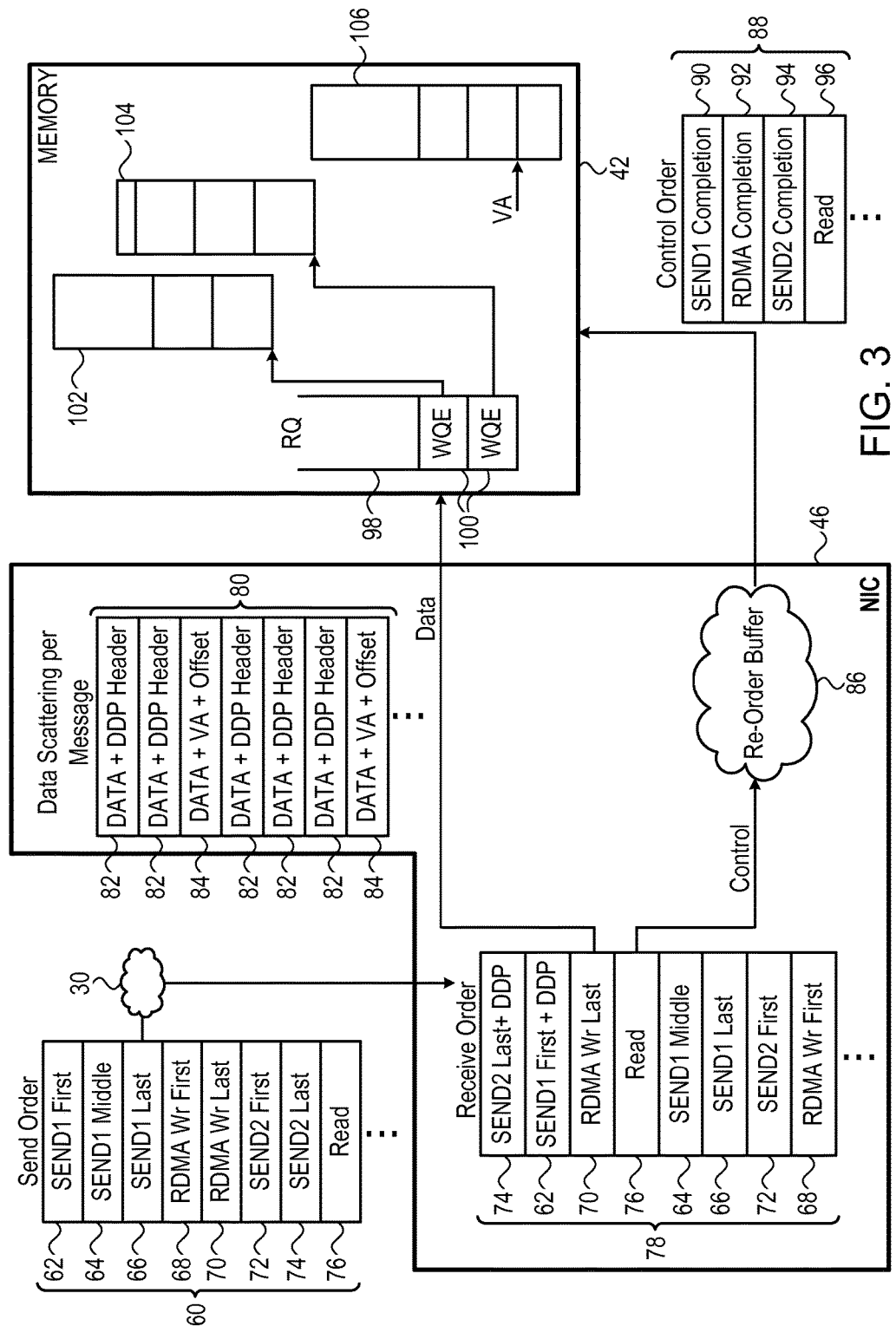
FIG. 3 is a block diagram that schematically illustrates a method of processing data packets received out of order by a NIC, in accordance with an embodiment of the present invention.

FIG. 3 is a block diagram that schematically illustrates a method of processing data packets received out of order by NIC 46, in accordance with an embodiment of the present invention. It is assumed in the present example that these packets are received from a remote node using a reliable transport service, such as RC, XRC, or DC, as explained above in the Background section. (In general, out-of-order packet delivery is handled differently on unreliable transport services, and reordering may not be required.) Although only a single communication flow, on a single QP, is shown in the figure and described here, in practice NIC 46 will typically handle multiple flows concurrently in this manner, on multiple different QPs, interacting with multiple different nodes on network 30.

A sending node (for example, host computer 26) transmits packets 62, 64, 66, 68, 70, 72, 74, 76, . . . , in a send order 60. In this example, packets 62, 64 and 66 are the first, middle, and last packets, respectively, in a first SEND transaction initiated by the sending node. This transaction is followed by an RDMA write transaction, comprising first and last packets 68 and 70; another SEND transaction, comprising first and last packets 72 and 74; and finally a read request (such as an RDMA read request) in a packet 76.

After transmission through network 30, however, the packets reach NIC 46 in a receive order 78, which in this case is very different from send order 60: Not only does the order of packets within a particular transaction change (for example, packets 72 and 74 in the second SEND transaction), but the order of received transactions may change, as well. Thus, in the pictured example, read request packet 76 arrives at NIC 46 before any of the SEND or RDMA write transactions have been completed. NIC could complete the read transaction, by reading the requested data from memory 42 and transmitting it in packets to the requesting node, as soon as packet 76 has been received. Executing the transactions in this order, however, might give erroneous results, since it is possible (and even likely) that the data in the requested range will be affected by the data written in the SEND and/or RDMA write transactions that precede the read transaction in send order 60.

As noted earlier, NIC 46 may buffer the data payloads of packets received so that data placement in memory 42 is carried out only in the proper transaction order, as long as the NIC has a large, dedicated buffer for temporary data placement. In the example shown in FIG. 3, however, packet processing circuitry 52 in NIC 46 scatters the payload data directly into the appropriate destination buffers in memory 42, even before transaction handling is completed. This data placement is carried out in a placement order 80, which generally tracks receive order 78, rather than send order 60. Order 80 in the present example includes two types of direct data placement operations: SEND placement operations 82 (for packets 74, 62, 64, 66 and 72 in receive order 78), and RDMA write placement operations 84 (for packets 70 and 68). In general, packets carrying RDMA read response data may be handled in a similar fashion, but they are omitted here for the sake of simplicity.

To enable proper placement and handling of SEND transactions, the sending node may incorporate a direct data placement (DDP) field into the packet header or payload. In each SEND packet, the DDP field contains a command index, such as the WQE index of the WQE that invoked the transaction, and an offset value, indicating the offset (typically in bytes) of the data in the payload of the current packet relative to the start of the message.

Packet processing circuitry 52 in NIC 46 uses the DDP field (referred to in FIG. 3 as the "DDP header") to choose the buffer location in memory 42 to which the payload data in each packet should be written. Thus, for each new WQE index encountered in data placement operations 82, circuitry 52 reads a receive WQE 100 from an appropriate receive queue 98 in memory. This WQE 100 points to the base address of a corresponding data buffer 102, 104, ..., in memory 42. For each packet having the particular WQE index, circuitry 52 computes the write location within buffer 102 or 104 based on the offset value in the DDP field.

Thus, all SEND packet payload data may be written to the appropriate memory locations regardless of the order of the received packets. In the example shown in FIG. 3, for instance, upon receiving packet 74 (late in send order 60, but first in receive order 78), NIC 46 will read the first WQE 100 from receive queue 98 in order to identify buffer 104. The NIC will then write the packet payload to a location at an offset form the base address of the buffer that is indicated in the DDP field. The payload of packet 72 will be written to buffer 104 much later. Upon receiving packet 62, after packet 74, NIC 46 will read the next WQE 100 and will write the packet payload to buffer 102. The data scattering process will proceed accordingly over receive order 78.

RDMA write placement operations 84 are handled in a similar fashion, but without the need to access read queue 98. Instead, RDMA write payloads are written to a buffer 106 indicated by the destination address field in the RDMA write header. Assuming NIC 46 provides virtual addressing support (as described, for example, in U.S. Patent Application Publication 2013/0067193, whose disclosure is incorporated herein by reference), the destination memory address may be a virtual address (VA). Packet processing circuitry 52 computes the offset within buffer 106 based on the DDP field and then writes the data in each RDMA payload to memory 42 appropriately.

Notwithstanding the direct placement of data into buffers 102, 104, 106 in memory 42, packet processing circuitry 52 carries out and completes the underlying transactions in a control order 88, which corresponds generally to the actual order of the messages in send order 60. For this purpose, circuitry 52 maintains a reordering buffer 86, in which transaction context is maintained and updated for each arriving packet 74, 62, ..., 68 in receive order 78. Circuitry 52 opens a record in buffer 86 for each new incoming transaction, based on the message type, as indicated by the transport header of the packet, and, typically, the WQE index, which enables successive transactions (such as SEND1 and SEND2 in the figure) to be distinguished from one another. Each transaction is held in buffer 86 until NIC 46 has received the last packet in the corresponding message and until all transactions that must be completed previously have been completed. Packet processing circuitry 52 is typically able to track the packet order and identify the last packet in each transaction using data fields in the packet headers, including packet serial numbers and opcodes, as are known in the art.

As noted earlier, buffer 86 generally releases transactions for execution by circuitry 52 in order of the corresponding WQE index values. Thus, in control order 88, NIC 46 completes incoming transactions 90, 92, 94, 96, ..., in the order in which they appeared in send order 60. Specifically, in this example, read transaction 96, in which NIC 46 reads data from memory 42 and transmits a read response message containing the data back to the requester, takes place only after send transactions 90 and 94 and RDMA write transaction 92 have been completed. It is thus ensured that all of the corresponding data have been written to buffers 102, 104, 106 before the read response takes place.

On the other hand, for some types of transactions, packet processing circuitry 52 may be permitted to perform the transactions out of order. For example, successive SEND transactions may in some cases be performed out of order. This sort of situation might arise, for instance, if NIC 46 receives packets 72, 74 of the second SEND operation (SEND2) before receiving all packets 62, 64, 66 of the first SEND operation (SEND1). In this case, violation of the transaction order in performing the data scattering part of the SEND transactions will have no impact on application performance, since the two transactions use different, distinct buffers 102 and 104. In general, however, the NIC will actually complete the transactions (for example, by writing corresponding CQEs to the appropriate completion queue) in the actual send order 60.

As noted earlier, although system 20 and NIC 46 are described above with reference to features of IB networks and protocols, the principles of the present invention may also be applied, mutatis mutandis, in supporting reliable data transport over networks and protocols of other types. For example, the techniques described above may be applied to RDMA transport in IP networks and can be particularly useful over lossy switch fabrics, such as Ethernet fabrics.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   receiving in a network interface controller (NIC) of a receiving node from a sending node, over a network a succession of data packets belonging to a sequence of remote direct memory access (RDMA) transactions, including at least:
      one or more first packets belonging to an RDMA write transaction initiated by the sending node, which causes the NIC to write first data from the one or more first packets to a host memory of the receiving node; and
      a second packet belonging to an RDMA read transaction initiated by the sending node after the RDMA write transaction, wherein the RDMA read transaction requests that the NIC of the receiving node read and transmit second data from the host memory of the receiving node back to the sending node,
wherein the second packet is received at the receiving node before at least one of the one or more first packets;
at the NIC of the receiving node, upon receipt of the one or more first packets, writing the first data from the one or more first packets in the succession to respective locations in a buffer in the host memory of the receiving node; and
delaying execution of the RDMA read transaction at the NIC of the receiving node so that none of the second data are transmitted by the NIC from the host memory of the receiving node back to the sending node until all of the one or more first packets have been received by the NIC and the RDMA write transaction has been executed by the NIC at the receiving node.

2. The method according to claim 1, wherein the succession of the data packets further includes one or more third packets containing third data and belonging to a SEND transaction executed by the sending node after the RDMA write transaction, and wherein at least one of the third packets is received at the receiving node before the at least one of the one or more first packets, and
wherein the method comprises writing the third data from the at least one of the third packets to the host memory of the receiving node before all of the one or more first packets have been received.

3. The method according to claim 1, wherein writing the first data comprises computing, in the NIC, respective locations in the host memory of the receiving node for the data in the one or more first packets, and placing the data directly from the NIC into the respective locations.

4. The method according to claim 3, wherein placing the data comprises writing the data to the respective locations in an order of reception of the packets in the succession, irrespective of the transactions.

5. The method according to claim 1, wherein the RDMA write and RDMA read transactions are executed by the sending node in response to first and second commands, having respective first and second command indices indicative of an order of execution of the commands, wherein the first and second packets respectively contain the first and second command indices, and
wherein delaying the execution comprises determining the order of the execution of the RDMA write and RDMA read transactions at the receiving node responsively to the command indices contained in the packets.

6. The method according to claim 5, wherein the commands comprise work queue elements (WQEs), which are executed in succession on a single queue pair (QP).

7. A network interface controller (NIC), comprising:
a host interface, which is coupled to communicate with a host processor, having a host memory;
a network interface, which is configured to receive over a network from a sending node a succession of data packets belonging to a sequence of remote direct memory access (RDMA) transactions, including at least:
one or more first packets belonging to an RDMA write transaction initiated by the sending node, which directs the NIC to write first data from the one or more first packets to the host memory; and
a second packet belonging to an RDMA read transaction initiated by the sending node after the RDMA write transaction, wherein the RDMA read transaction directs the NIC to read and transmit second data from the host memory back to the sending node,
wherein the second packet is received at the network interface before at least one of the one or more first packets; and
packet processing circuitry, coupled between the host interface and the network interface and configured, upon receipt of the one or more first packets, to write the first data from the one or more first packets in the succession via the host interface to respective locations in a buffer in the host memory, while delaying execution of the RDMA read transaction so that none of the second data are transmitted by the NIC from the host memory back to the sending node until all of the one or more first packets have been received by the NIC and the RDMA write transaction has been executed by the NIC.

8. The NIC according to claim 7, wherein the succession of the data packets further includes one or more third packets containing third data and belonging to a SEND transaction executed by the sending node after the RDMA write transaction, and wherein at least one of the third packets is received at the network interface before the at least one of the one or more first packets, and
wherein the packet processing circuitry is configured to write the third data from the at least one of the third packets to the host memory before all of the one or more first packets have been received.

9. The NIC according to claim 7, wherein the packet processing circuitry is configured to compute respective locations in the host memory for the data in the one or more first packets, and to place the data directly via the host interface into the respective locations.

10. The NIC according to claim 9, wherein the packet processing circuitry is configured to write the data to the respective locations in an order of reception of the packets in the succession, irrespective of the transactions.

11. The NIC according to claim 7, wherein the RDMA write and RDMA read transactions are executed by the sending node in response to first and second commands, having respective first and second command indices indicative of an order of execution of the commands, wherein the first and second packets respectively contain the first and second command indices, and
wherein the packet processing circuitry is configured to determine the order of the execution of the RDMA write and RDMA read transactions responsively to the command indices contained in the packets.

12. The NIC according to claim 11, wherein the commands comprise work queue elements (WQEs), which are executed in succession on a single queue pair (QP).

* * * * *